United States Patent [19]
Palmer

[11] Patent Number: 4,560,148
[45] Date of Patent: Dec. 24, 1985

[54] LOG SKIDDER VEHICLE BRAKE SYSTEM

[75] Inventor: Marvin K. Palmer, Montgomery, Ill.

[73] Assignee: Caterpillar Tractor Co., Peoria, Ill.

[21] Appl. No.: 648,235

[22] PCT Filed: Mar. 22, 1982

[86] PCT No.: PCT/US82/00353
   § 371 Date: Mar. 22, 1982
   § 102(e) Date: Mar. 22, 1982

[51] Int. Cl.[4] .............................................. B66D 1/08
[52] U.S. Cl. .................................. 254/323; 254/361;
                            180/271; 414/569; 303/13
[58] Field of Search ............................ 254/279–282,
      254/323–328, 361; 192/4 A, 4 R; 303/6 R, 13;
                                          414/569; 180/271

[56] References Cited
U.S. PATENT DOCUMENTS

| | | | |
|---|---|---|---|
| 1,987,688 | 1/1935 | Lamp | 254/326 X |
| 2,464,039 | 3/1949 | Howell | 254/323 |
| 3,091,976 | 6/1963 | Johnson et al. | 74/364 |
| 3,380,545 | 4/1968 | Kemper | 180/2.1 |
| 3,444,968 | 5/1969 | Golan et al. | 192/4 |
| 3,939,937 | 2/1976 | Moberg | 192/4 A |
| 4,063,624 | 12/1977 | Beck et al. | 192/4 A |
| 4,128,276 | 12/1978 | Beck | 303/13 |
| 4,257,503 | 3/1981 | Lutnick | 192/4 A X |
| 4,293,164 | 10/1981 | Hoefer | 303/13 |

Primary Examiner—John M. Jillions
Attorney, Agent, or Firm—Joseph W. Keen

[57] ABSTRACT

A log skidding vehicle (10) having a winch (18) controlled by a lever (20) on which is mounted means (50) for simultaneously actuating a transmission neutralizer (46) and a brake apparatus (38). The actuating means (50), when engaged by the operator, causes a winch brake control valve (32) to transmit compressed air to the brake apparatus (38). Simultaneously therewith, the actuating means (50) causes a transmission neutralizer control valve (42) to obstruct air flow to a transmission neutralizer (46) and thus cause a transmission (48) associated therewith and its shift lever (49) to move to a neutral position. By mounting the actuating means (50) on the winch control lever (20) operator visibility of the skidded load is improved and the operator's comfort is enhanced. In moving the transmission (48) and its shift lever (49) to neutral the utilizing vehicle will not, without additional operator action, move subsequent to disengagement of the brake apparatus (38).

6 Claims, 2 Drawing Figures

LOG SKIDDER VEHICLE BRAKE SYSTEM

TECHNICAL FIELD

This invention relates to log skidding vehicles having a winch and winch control member and, more particularly, to a brake system which applies the vehicle's service brakes simultaneously with neutralizing the vehicle's transmission.

BACKGROUND ART

Cable equipped log skidding vehicles are designed for dragging logs with a cable and associated chokers. Such log skidding vehicles have winches for retracting the cable and attached logs toward the vehicle and for unwinding cable from the winch to facilitate choker setting and log attachment. The winch is typically controlled by a winch control lever which the operator moves in a suitable direction to either retract or unwind the cable.

When winching a log bunch to a skidding position (relative to the skidding vehicle), the vehicle operator simultaneously must turn in his seat to view the log bunch rearwardly of the vehicle, operate the winch control lever typically arranged alongside his seat, modulate engine speed to regulate winch speed and force with a governor control device and apply the service brakes of the vehicle to winch against subsequently to shifting the transmission into neutral. While service brake and governor control have each been historically provided by a modulating foot-operated pedal, simultaneous operation of such brake pedal, governor control pedal, and the winch control lever while viewing rearwardly from the vehicle can cause the operator to assume an uncomfortable, contorted position not conducive to any of the operations, but, instead, a compromise among the three. To avoid such discomfort and provide improved operator visibility of the skidded load, operators have sometimes utilized a vehicle parking brake to winch against since it normally locked and, thus, did not require continuous exertion by the operator on the brake pedal. Use of the locking parking brake permitted the operator to devote his entire attention to the skidded load, governor control, and winch control lever. However, the parking brake is normally designed to hold the static load of the vehicle rather than the relatively larger loads imposed on the vehicle by winching the log bunches to their skidding positions. As a result of such unintended use, the parking brake's life was often adversely affected.

DISCLOSURE OF THE INVENTION

In one aspect of the present invention a log skidding vehicle having a transmission is provided with a brake system which is alternately actuatable by a service brake control valve and a winch control lever mounted actuator. The winch control lever mounted actuator, when applied, simultaneously applies the service brakes by actuating a winch brake control valve and neutralizes the transmission. The brake system is arranged to permit independent operation of the service brake control valve and the winch brake control valve.

BRIEF DESCRIPTION OF THE DRAWINGS

The invention will be more fully understood from the following detailed description of a preferred embodiment, taken in connection with the accompanying drawings, in which.

BEST MODE FOR CARRYING OUT THE INVENTION

Figure 1:
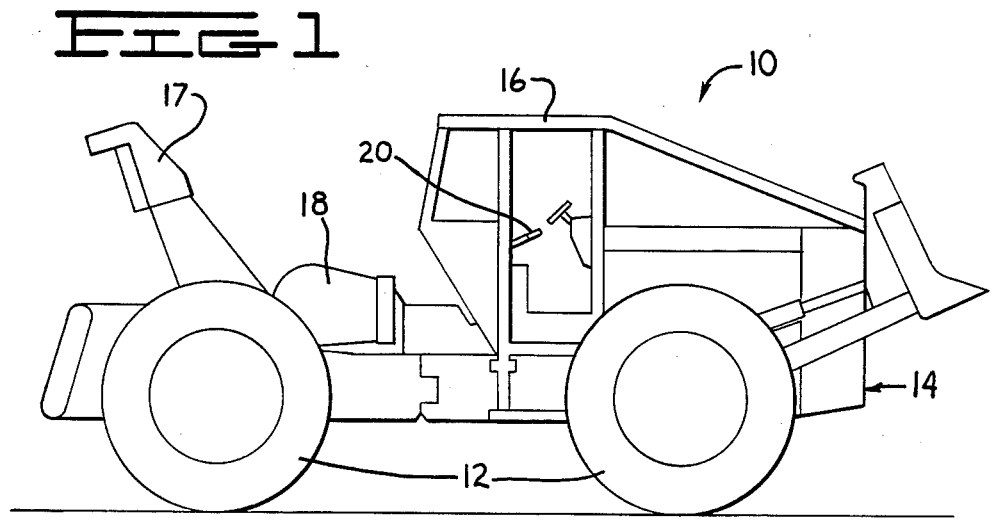
FIG. 1 is a side elevation view of an exemplary log skidding vehicle.

Referring now to FIG. 1, a log skidding vehicle 10 includes ground engaging members such as the illustrated four wheels 12 (only two are shown) and a chassis 14 which has an operator enclosure 16 mounted thereon. On the rear of the chassis 14 is mounted an integral arch-fairlead 17 and a winch 18 which selectively retracts and pays out cable through the fairlead 17 to facilitate its attachment to logs typically through the use of chokers (not shown). A winch control lever 20 is mounted within the operator enclosure 16 and is used to actuate the cable winch 18 to winch logs to an optimal skidding position relative to the vehicle 10.

Figure 2:
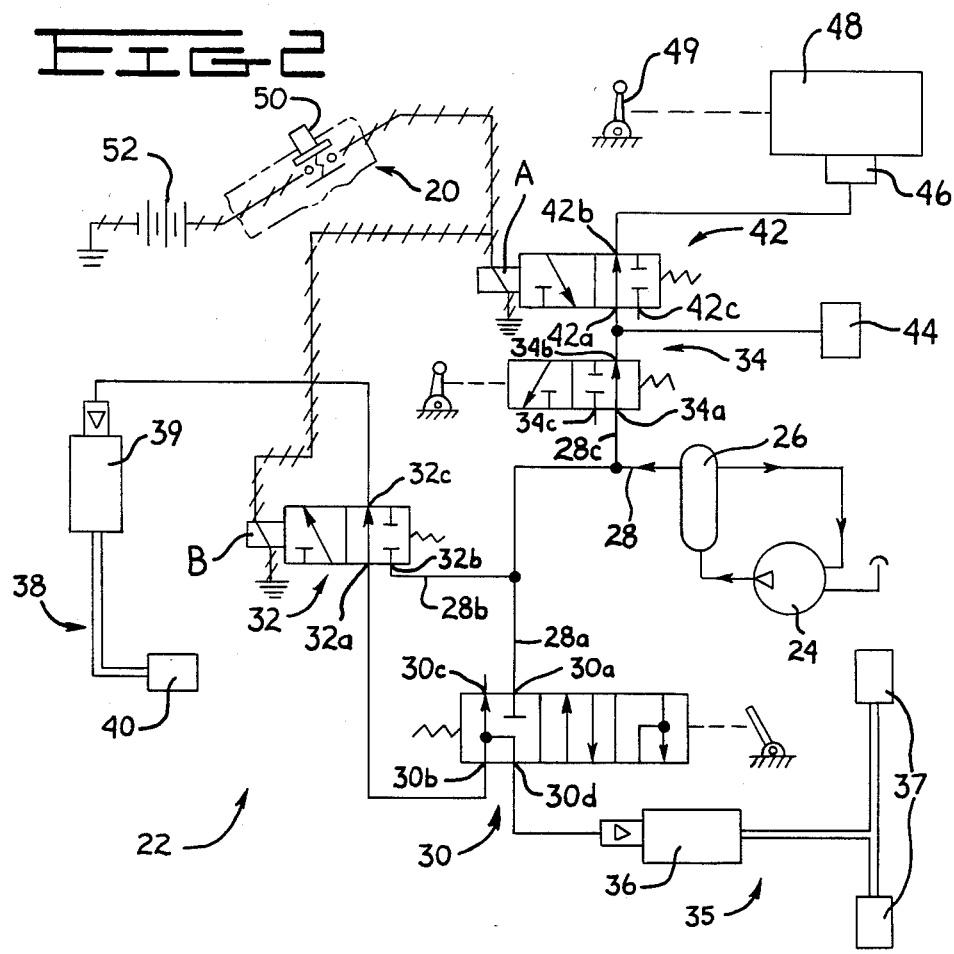
FIG. 2 is a schematic illustration of that vehicle's brake system and transmission neutralizer.

FIG. 2 is a schematic illustration of the brake system 22 of the vehicle 10. An air compressor 24 supplies pressurized air to a reservoir 26 from which a fluid line 28 extends and trifurcates into supply lines 28a, 28b, and 28c which respectively connect to a service brake control valve 30, a winching brake control valve 32, and a parking brake control valve 34. The service brake control valve 30 has a supply port 30a to which the supply line 28a is connected, an exhaust port 30c, and a first and a second routing port 30b and 30d respectively.

A wheel brake apparatus 35 includes a wheel brake master cylinder 36 and wheel brakes 37 arranged such that the master cylinder 36 is in open fluid communication with the second routing port 30d and the wheel brakes 37. The winch brake control valve 32 includes a first inlet port 32a and a second inlet port 32b which are respectively in open fluid communication with the first routing port 30b and the supply line 28b. The outlet port 32c is fluidly connected to a drive line master cylinder 39 which actuates and deactuates a drive line service brake 40. The master cylinder 39 and driveline service brake 40 together comprise a driveline brake apparatus 38.

The parking brake control valve 34 has an inlet port 34a, an outlet port 34b, and an exhaust port 34c. The inlet port 34a is connected to the supply line 28c and the outlet port 34b is fluidly connected to both a parking brake 44 and a transmission neutralizer control valve 42 through its inlet port 42a. The transmission neutralizer control valve 42 also includes an outlet port 42b and an exhaust port 42c which respectively fluidly communicate with a transmission neutralizer 46 and the atmosphere. The transmission neutralizer 46 is operatively connected to a transmission 48 for shifting such transmission 48 into a neutral gear and moving the transmission's gear selector lever 49 to the neutral position.

The service brake control valve 30 is preferably a three-position, progressive brake engagement valve (illustrated in the non-braking mode) while the transmission neutralizer control valve 42 and the winching brake control valve 32 are each preferably two-position valves which are actuated by solenoids A and B respectively. The parking brake control valve 34 is also preferably of two-position construction.

The solenoids A and B of the transmission neutralizer control valve 42 and winching brake control valve 32 respectively are easily energized by actuating a switch 50 which is joined to the winch control lever 20 to simultaneously actuate such solenoid valves with a battery 52. All valves in FIG. 2 are schematically illustrated in the position which they occupy for the normal, non-braking vehicle movement mode.

INDUSTRIAL APPLICABILITY

The advantages of the present invention are most easily illustrated by describing various braking modes for the brake system 22 schematically illustrated in FIG. 2. During normal movement of the log skidding vehicle 10, air pressure in the reservoir 26 is communicated directly to the parking brake 44 through the supply line 28c and the parking brake control valve 34 and indirectly to the transmission neutralizer 46 through the transmission neutralizer control valve 42. Communicating compressed air to the parking brake 44 prevents application thereof and blocks actuation of the transmission neutralizer 46. Compressed air communication through the service brake control valve 30 and winching brake control valve 32 is obstructed (as illustrated) for vehicle movement.

When it is desired to decelerate the vehicle 10, the service brake control valve 30 is shifted to its middle position wherein compressed air supplied to the supply port 30a is transmitted to the wheel brake master cylinder 36 for applying the wheel brakes 37. During such wheel brake application, fluid communication is maintained between the drive line service brake's master cylinder 39 and the exhaust port 30c to ensure disengagement of the drive line service brake 40. If additional service braking is desired, the service brake control valve 30 is shifted to its rightmost position wherein compressed air transmitted to the supply port 30a is communicated to the wheel brake master cylinder 36 and to the drive line service brake master cylinder 39.

The vehicle's parking brake 44 is of conventional, spring applied-air released design which permits brake application by shifting the parking brake control valve 34 to its left position so as to obstruct compressed air flow thereto, bleed compressed air from the parking brake 44 to the atmosphere through the exhaust port 34c, and permit a spring or other biasing means (not shown) to engage the parking brake 44. Movement of the parking brake control valve 34 to its left position obstructs air flow to and thus actuates the transmission neutralizer 46 so as to cause the transmission 48 to be shifted to the neutral mode.

When the vehicle 10 is stationary and actuation of the winch 18 is desired, the winch control lever 20 is moved to operate the winch 18 in the appropriate direction. The operator closes the actuation switch 50 to energize the solenoids A and B and, thus, engage the drive line service brake 40 and neutralize the transmission 48. Energizing the solenoid A shifts the transmission neutralizer control valve 42 to its left position wherein compressed air flow into the valve 42 through the inlet port 42a is obstructed while air from the transmission neutralizer 46 is transmitted through the exhaust port 42c to atmosphere. When the solenoid B is energized, the winching brake control valve 32 is shifted to its left position and air flow into the valve 42 through the inlet port 32a is obstructed while compressed air supplied to the inlet port 32b is communicated to the outlet port 32c. The winching brake control valve 32 and transmission neutralizer control valve 42 are actuatable by the actuation switch 50 attached to the winch control lever 20 and are thus operationally independent from the service brake control valve 30.

By permitting actuation of the service brake 40 with the electric switch 50 rather than through the normal foot pedal, the operator of the log skidding vehicle 10 can easily apply the service brakes 40 (to winch against) simultaneously with actuating the winch control lever 20, governor control and looking rearwardly from the operator station 16 so as to facilitate log movement to an optimum skidding position relative to the vehicle 10. By making it more convenient for the operator to apply the drive line service brake 40, the life of the parking brake 44 will be prolonged since the parking brake will no longer be used to brake the vehicle during winching. Moreover, by neutralizing the transmission 48 through the solenoid actuated transmission neutralizer control valve 42, the transmission is not only neutralized but the gear shift selector 49 is moved to the neutral position so as to require operator action subsequent to release of the drive line service brake 40. Requiring additional operator action after transmission neutralization avoids unexpected vehicle movement upon cessation of service brake application once the logs have been moved to their skidding position and prior to the operator assuming a frontward facing driving position.

While the illustrated brake system 22 has a progressively applied service brake arrangement (the wheel brakes 37 applied prior to the driveline service brake 40) and uses an air-oil fluid network, it is to be understood that the present invention can be used with equal facility with a brake system having a single set of brakes (either wheel or driveline), multiple sets of simultaneously applied brakes, or a single fluid on both sides of the master cylinders 36 and 39. In the case of a single fluid system the compressor 24 would, of course, be replaced by a suitable pump and the valves' exhaust ports would vent to a reservoir.

It should now be apparent that an improved braking system 22 has been provided in which service brake actuation and transmission neutralizing is accomplished by actuating a switch 50 mounted on the vehicle's winch control lever 20. Actuation of the electrical switch 50 simultaneously energizes the solenoids A and B and thus induces transmission neutralizing and service brake application. Providing both brake application and transmission neutralizing functions from a winch control lever mounted switch 50 discourages use of the parking brake 44 for winching operations and enables the operator to simultaneously apply the service brake 40 and view rearwardly from the operator enclosure 16 without assuming a contorted posture.

I claim:

1. A log skidding vehicle brake system (22) comprising:
    a plurality of ground engaging members (12);
    a transmission (48) for transmitting power to said ground engaging members (12);
    a source (24) of pressurized fluid;
    means (38) for braking movement of said ground engaging members (12), said braking means (38) being actuatable by pressurized fluid;
    first means (30) for selectively transmitting pressurized fluid between said fluid source (24) and said braking means (38);
    second means (32) for selectively transmitting pressurized fluid between said fluid source (24) and said braking means (38);

means (46) for shifting said transmission (48) to neutral;

a winch (18) for selectively retracting and extending a cable; and means (20) for actuating said winch (18), said winch actuating means (20) including a displaceable lever (20) having mounted thereon means (50) for simultaneously actuating said second fluid transmitting means (32) and said transmission shifting means (46).

2. The brake system (22) of claim 1 wherein said transmission (48) has a displaceable gear selector (49) which is movable to a neutral position by said transmission shifting means (46).

3. The brake system (22) of claim 1 wherein said second fluid transmitting means (32) constitutes a selectively actuatable second valve (32) having a first inlet port (32a), a second inlet port (32b), and an outlet port (32c), said second inlet port (32b) being in fluid communication with said fluid source (24), said outlet port (32c) being in fluid communication with said braking means (38), said second valve (32), when actuated, providing fluid communication between said second inlet port (32b) and said outlet port (32c) and, when unactuated, providing fluid communication between said first inlet port (32a) and said outlet port (32c).

4. The brake system (22) of claim 3 wherein said first fluid transmitting means (30) constitutes a selectively actuatable first valve (30) having a supply port (30a), a first routing port (30b), and an exhaust port (30c), said supply port (30a) being in fluid communication with said fluid source (24) and said routing port (30b) being in fluid communication with said first inlet port (32a), said first valve (30) providing fluid communication between said supply port (30a) and said routing port (30b) only when actuated, said valve (30) providing fluid communication between said first routing port (30b) and said exhaust port (30c) when said valve is unactuated.

5. The brake system (22) of claim 4 wherein said first valve (30) has a second routing port (30d), said first valve (30) providing fluid communication between said second routing port (30d) and said exhaust port (30c) when said first valve (30) is unactuated, said first valve (30), when actuated, providing fluid communication between said supply port (30a) and said second routing port (30d).

6. The brake system (22) of claim 5 further comprising second means (35) for braking movement of the ground engaging members (12), said second braking means (35) being in fluid communication with said second routing port (30d).

* * * * *